US010169873B2

(12) United States Patent
Gur et al.

(10) Patent No.: US 10,169,873 B2
(45) Date of Patent: Jan. 1, 2019

(54) WEAKLY SUPERVISED PROBABILISTIC ATLAS GENERATION THROUGH MULTI-ATLAS LABEL FUSION

(71) Applicant: INTERNATIONAL BUSINESS MACHINES CORPORATION, Armonk, NY (US)

(72) Inventors: Yaniv Gur, San Jose, CA (US); Mehdi Moradi, San Jose, CA (US); Tanveer F. Syeda-Mahmood, Cupertino, CA (US); Hongzhi Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/468,089

(22) Filed: Mar. 23, 2017

(65) Prior Publication Data

US 2018/0276813 A1 Sep. 27, 2018

(51) Int. Cl.
| | |
|---|---|
| G06K 9/00 | (2006.01) |
| G06T 7/00 | (2017.01) |
| G06T 7/11 | (2017.01) |
| A61B 8/13 | (2006.01) |

(52) U.S. Cl.
CPC .............. *G06T 7/0012* (2013.01); *G06T 7/11* (2017.01); *G06T 2207/10081* (2013.01); *G06T 2207/20081* (2013.01)

(58) Field of Classification Search
CPC .................................. G06K 9/00; G06T 7/00
USPC .......................... 382/128–134; 600/443, 587
See application file for complete search history.

(56) References Cited

U.S. PATENT DOCUMENTS

| | | | | |
|---|---|---|---|---|
| 7,876,938 | B2 * | 1/2011 | Huang | .................... G06T 7/174 |
| | | | | 382/128 |
| 2014/0226882 | A1 | 8/2014 | Collins et al. | |

FOREIGN PATENT DOCUMENTS

WO    2015128775 A1    9/2015

OTHER PUBLICATIONS

Iglesias, J.E. et al., "A generative model for multi-atlas segmentation across modalities," 2012 9th IEEE International Symosium on Biomedical Imaging (ISBI), 2012, pp. 888-891.
Gong, T. et al., "Automatic labeling and classification of brain CT images," 2011 18th IEEE International Conference on Image Processing (ICIP), 2011, pp. 1581-1584.

(Continued)

*Primary Examiner* — Abolfazl Tabatabai
(74) *Attorney, Agent, or Firm* — IP Authority, LLC; Ramraj Soundararajan

(57) ABSTRACT

In many medical image classification problems, distinctive image features are often localized in certain anatomical regions. The key to efficient and accurate classification in such problems is the localization of the region of interest (ROI). To address this problem, a multi-atlas label fusion technique was developed for automatic ROI detection. Given training images with class labels, the present method infers voxel-wise scores for each image showing how distinctive each voxel is for categorizing the image. The present method for ROI segmentation and for class specific ROI patch extraction in a 2D cardiac CT body part classification application was applied and shows the effectiveness of the detected ROIs.

16 Claims, 4 Drawing Sheets

(56) References Cited

OTHER PUBLICATIONS

Sedai, S. et al., "Multi-atlas label fusion using hybrid of discriminative and generative classifiers for segmentation of cardiac MR images," 2015 37th Annual International Conference of the IEEE Engineering in Medicine and Biology Society (EMBC), 2015, pp. 2977-2980.
Bhagwat, N. et al., "Improving multi-atlas segmentation accuracy by leveraging local neighborhood information during label-fusion," 2015 12th IEEE International Symposium on Biomedical Imaging (ISBI), 2015, pp. 617-620.
Aljabar, P. et al., "Multi-atlas based segmentation of brain images: Atlas selection and its effect on accuracy," NeuroImage, 2009, 46, pp. 726-739.
Avants, B. et al., "Symmetric diffeomorphic image registration with cross-correlation: Evaluating automated labeling of elderly and neurodegenerative brain," Medical Image Analysis, 2008, 12(1), pp. 26-41.
Besag, J., "Statistical analysis of non-lattice data," The Statistician, Sep. 1975, 24(3), pp. 179-195.
Chatfield, K. et al., "Return of the devil in details: Delving deep into convolution nets," Proceedings of the BMVC 2014, Jan. 2014, pp. 1-11.
Chen, E. et al., An automatic diagnostic system for ct liver image classification, IEEE Trans. on Biomedical Engineering, 1998, 45(6), pp. 783-794.
Coupe, P. et al., "Simultaneous segmentation and grading of anatomical structures for patient's classification: application to alzheimer's disease," NeuroImage, 2012, 59(4), pp. 3736-3747.
Dalal, N. et al., "Histograms of oriented gradients for human detection," CVPR 2005, Jun. 2005, vol. 1, pp. 886-893.
Kim G. et al., "Unsupervised detection of regions of interest using iterative link analysis," Advances in neural information processing systems, 2009, pp. 961-969.
Moradi, M et al., "Viewpoint recognition in cardiac ct images," Functional Imaging and Modeling of the Heart, Springer, 2015, pp. 180-188.
Ojala, T. et al., "A comparative study of texture measure with classification based on featured distributions," Pattern recognition, 1996, 29(1), pp. 51-59.
Dark, J.H. et al., "Automatic cardiac view classification of echocardiogram," IEEE 11th International Conf on Computer Vision, ICCV 2007, 2007, pp. 1-8.
Rohlfing, T. et al., Evaluation of atlas selection strategies for atlas-based image segmentation with application to confocal microscopy images of bee brains, NeuroImage, 2004, 21(4), pp. 1428-1442.
Wang, H. et al., Multi-atlas segmentation with joint label fusion, IEEE Trans on Pattern Analysis and Machine Intelligence, 2013, 35(3), pp. 611-623.
Yan, Z. et al., Bodypart recognition using multi-stage deep learning, Information Processing in Medical Imaging, Springer, 2015, pp. 449-461.

* cited by examiner

WEAKLY SUPERVISED PROBABILISTIC ATLAS GENERATION THROUGH MULTI-ATLAS LABEL FUSION

BACKGROUND OF THE INVENTION

Field of Invention

The present invention relates generally to the field of image classification. More specifically, the present invention is related to weakly supervised probabilistic atlas generation through multi-atlas label fusion.

Discussion of Related Art

Image classification is widely applied in medical image analysis. It is often addressed by image feature extraction and supervised learning. For applications such as disease classification [see papers to Chen et al. entitled, "An automatic diagnostic system for ct liver image classification," IEEE Transactions on Biomedical Engineering, 1998; and Coupe et al. entitled, "Simultaneous segmentation and grading of anatomical structures for patient's classification: application to Alzheimer's disease," IEEE Transactions on Biomedical Engineering, 1998] and body part recognition [see paper to Yan et al. entitled, "Bodypart recognition using multi-stage deep learning," Information Processing in Medical Imaging, 2015], where distinctive features are locally distributed around certain anatomical regions, the key to efficient and accurate classification is the localization of the region of interest (ROI).

Manual ROI labeling is accurate but time consuming [see paper to Coupe et al. entitled, "Simultaneous segmentation and grading of anatomical structures for patient's classification: application to Alzheimer's disease," NeuroImage, 2012]. A multi-atlas approach is proposed for automatic anatomical ROI detection and applying it to body part classification [see papers to Park et al. entitled, "Automatic cardiac view classification of echocardiogram," IEEE $11^{th}$ International Conference on Computer Vision, 2007; Moradi et al. entitled, "Viewpoint recognition in cardiac CT images," Springer, 2015; and Yan et al. entitled, "Bodypart recognition using multi-stage deep learning," Springer, 2015]. The present invention's approach is motivated by the following observations: 1) comparing to standard learning-based image classification that does not use registration [e.g., see paper to Yan et al. entitled, "Bodypart recognition using multi-stage deep learning," Springer, 2015], registration-based multi-atlas label fusion is more effective in capturing subtle pattern variations for medical image classification [see paper to Coupe et al. entitled, "Simultaneous segmentation and grading of anatomical structures for patient's classification: application to Alzheimer's disease," NeuroImage, 2012]; and 2) distinctive anatomical ROIs derived across images for the same class should be consistent with each other, which can be naturally modeled through registration for anatomy classification.

As background, learning-based patch selection [see papers to Kim et al. entitled, "Unsupervised detection of regions of interest using iterative link analysis," Advances in neural information processing systems, 2009; and Yan et al., "Bodypart recognition using multi-stage deep learning," Information Processing in Medical Imaging, 2015] aims to find distinctive/informative patches from a pool of local patches pre-extracted from training images. For such methods, accurate ROI patch selection relies on the fact that proper ROI patches are already included in the pre-selected patches. Hence, its accuracy is limited by the sampling strategy for generating pre-extracted patches. Furthermore, it is inefficient for handling the situation where distinctive patches may have large scale variations across classes. In contrast, given a set of training images with class labels, our method infers voxel-wise estimation for each image showing how distinctive each voxel is for categorizing the image, from which accurate ROI segmentation can be easily derived.

The present method is applied to classify 2D cardiac CT images into one of the 9 representative classes defined for cardiac disease analysis. Shown is the state of the art body part classification performance and that employing the class specific ROIs derived from the present method substantially improves classification performance.

Embodiments of the present invention are an improvement over prior art systems and methods.

SUMMARY OF THE INVENTION

In one embodiment, the present invention provides a method to detect an anatomical region of interest (ROI) from training images having class labels to help image classification performance, the method comprising: (a) receiving, as input, a plurality of images, each image in the plurality of images having a class label $1 \leq l \leq L$ and a positive threshold th between 0 and 1 for use with discriminative score maps; (b) computing a discriminative score map for each image in the plurality of images using all remaining images as training images, where the discriminative score map for a given image comprises a spatial varying discriminative score for each image location within the given image; (c) for each class label l, smoothing any of the discriminative score maps produced for images with the label l; and (d) producing a region of interest mask for each image in the plurality of images by thresholding its discriminative score map by th such that the produced mask has value 1 for pixels with discriminative scores greater than th and 0, otherwise.

In an extended embodiment, the step of computing a discriminative score map for one target image I with label l using a set of training images $I_1, \ldots, I_n$ comprises: (a) calculating a deformable transformation between each training image $I_i$ in the set of training images $I_1, \ldots, I_n$ and the target image I based on an Advanced Normalization Tools (ANTs) registration algorithm; (b) warping each training image $I_i$ in the set of training images $I_1, \ldots, I_n$ to align with the target image I using the deformable transformation produced in step 2(a), where resulting warped image for $I_i$ is $F_i$; (c) for each location x in the target image I, calculating a non-negative weight $w_i(x)$ for each warped training image $F_i$ at location x by a joint label fusion algorithm using image intensity information in a neighborhood of x; and (d) calculating the discriminative score map for the target image at location x by summing the weights calculated in 2(c) for training images with class label l divided by the summed weights for all training images.

In another extended embodiment, the step of smoothing discriminative score maps produced for images with label l comprises: (a) receiving, as input, images with class label l, $I_1, \ldots, I_{n_l}$, and their corresponding discriminative score maps, $S_1, \ldots, S_{n_l}$, and iteration number IT; (b) for each image $I_i$ ($1 \leq i \leq n_l$) in 3(a), calculating deformable transformation between each of remaining image $I_j$ ($j \neq i$) and $I_i$ using Advanced Normalization Tools (ANTs) registration algorithm; (c) for each image $I_i$ ($1 \leq i \leq n_l$) in 3(a), warping each of the remaining images to $I_i$ using the respective deformable transformation calculated in 3(b), resulting in warped image for $I_j$ ($j \neq i$) is $F_j$; (d) for each location x in $I_i$, calculating a non-negative weight $w_j(x)$ for each image $F_j$ ($j \neq i$) at location x by a joint label fusion algorithm using image intensity information in a neighborhood of x; (e) updating image $I_i$'s smoothed discriminative score at location x by $$S_i(x) = \frac{\sum_{j=1,j\neq i}^{n_l} w_j(x) S_j(x)}{\sum_{j=1,j\neq i}^{n_l} w_j(x)};$$

and (f) repeating 3(d) through 3(e) N times.

The present invention also discloses an article of manufacture having non-transitory computer readable storage medium comprising computer readable program code executable by a processor in a mobile device to implement the methods described above.

In another embodiment, the present invention also provides a method to detect an anatomical region of interest (ROI) from training images having class labels to help image classification performance, the method comprising: (a) receiving, as input, a plurality of images, each image in the plurality of images having a class label $1 \leq l \leq L$ and a positive threshold th between 0 and 1 for use with discriminative score maps; (b) computing a discriminative score map for each image in the plurality of images using all remaining images as training images, where the discriminative score map for a given image comprises a spatial varying discriminative score for each image location within the given image, wherein the step of computing a discriminative score map for one target image I with label l using a set of training images $I_1, \ldots, I_n$ comprises: (i) calculating a deformable transformation between each training image $I_i$ in the set of training images $I_1, \ldots, I_n$ and the target image I based on an Advanced Normalization Tools (ANTs) registration algorithm; (ii) warping each training image $I_i$ in the set of training images $I_1, \ldots, I_n$ to align with the target image I using the deformable transformation produced in step (b)(i), where the resulting warped image for $I_i$ is $F_i$; (iii) for each location x in the target image I, calculating a non-negative weight $w_i(x)$ for each warped training image $F_i$ at location x by a joint label fusion algorithm using image intensity information in a neighborhood of x; and (iv) calculating the discriminative score map for the target image at location x by summing the weights calculated in (b)(iii) for training images with class label l divided by the summed weights for all training images; (c) for each class label l, smoothing discriminative score maps produced for images with label l, wherein the step of smoothing discriminative score maps produced for images with label l comprises: (i) receiving, as input, images with class label l, $I_1, \ldots, I_{n_l}$, and their corresponding discriminative score maps, $S_1, \ldots, S_{n_l}$, and iteration number IT; (ii) for each image $I_i$ ($1 \leq i \leq n_l$), calculating deformable transformation between each of the remaining image $I_j$ ($j \neq i$) and $I_i$ using Advanced Normalization Tools (ANTs) registration algorithm; (iii) for each image $I_i$ ($1 \leq i \leq n_l$), warping each of the remaining image to $I_i$ using the respective deformable transformation calculated in (c)(ii), with the resulting warped image for $I_j$ ($j \neq i$) is $F_j$; (iii) for each location x in $I_i$, calculating a non-negative weight $w_j(x)$ for each image $F_j$ ($j \neq i$) at location x by a joint label fusion algorithm using image intensity information in a neighborhood of x; (iv) updating image $I_i$'s smoothed discriminative score at location x by $$S_i(x) = \frac{\sum_{j=1,j\neq i}^{n_l} w_j(x) S_j(x)}{\sum_{j=1,j\neq i}^{n_l} w_j(x)};$$

and (v) repeating (c)(iv) through (c)(v) N times; and (d) producing a region of interest mask for each image in the plurality of images by thresholding its discriminative score map by th such that the produced mask has value 1 for pixels with discriminative scores greater than th and 0, otherwise.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
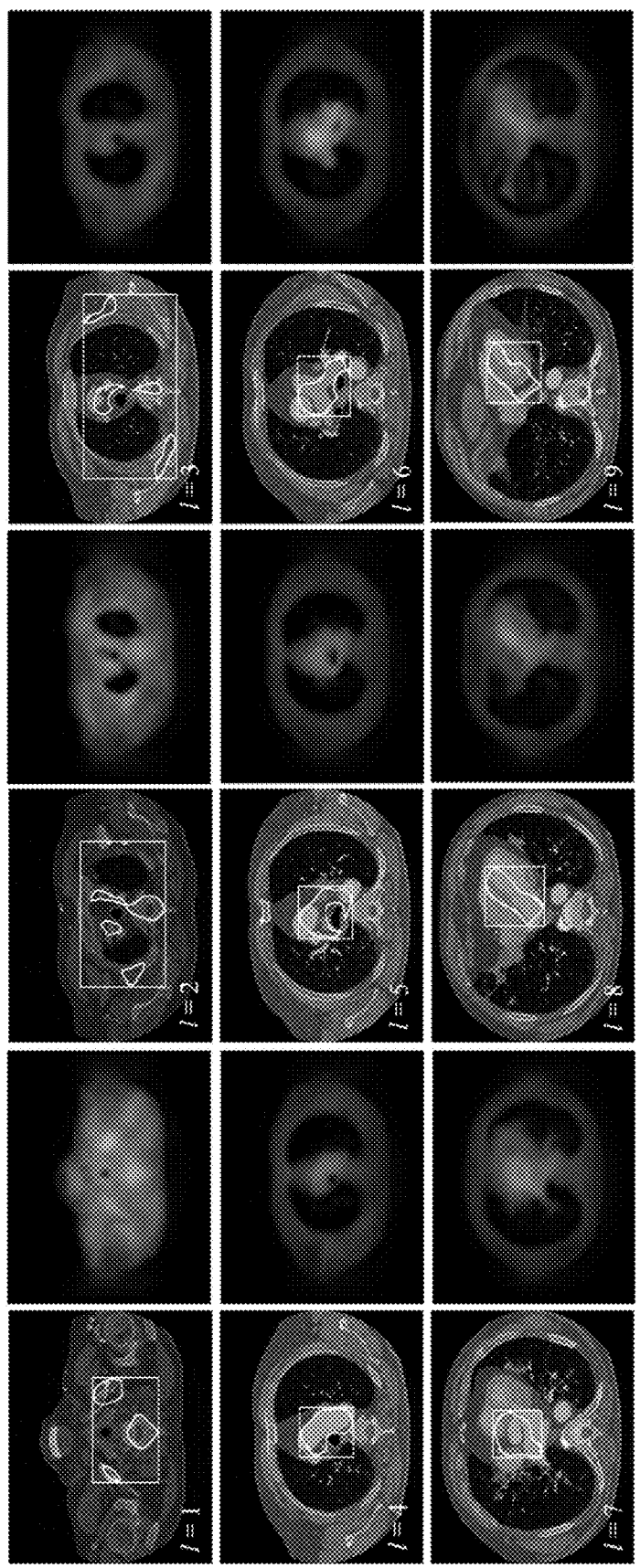
FIG. 1 illustrates semantic categories of example axial cardiac CT slices.

While this invention is illustrated and described in a preferred embodiment, the invention may be produced in many different configurations. There is depicted in the drawings, and will herein be described in detail, a preferred embodiment of the invention, with the understanding that the present disclosure is to be considered an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

2 Multi-Atlas ROI Detection for Anatomy Classification 2.1 Problem Definition

The input is a labeled classification dataset $\mathcal{I} = \{\mathcal{I}_1, \ldots, \mathcal{I}_n\}$, where n is the total number of class labels and $\mathcal{I}_l = \{I_l^1, \ldots, I_l^{n_l}\}$ contains a set of images that is assigned to class l and $n_l = |\mathcal{I}_l|$. The assumption is that images from different classes may share similar anatomical features; however, each image contains distinctive features that are common and unique for images from the same class. The goal is to localize the distinctive regions within each training image.

A spatially varying label random variable is defined as $l_I(x) \in \{1, \ldots, n\}$ for each image $I$ at each location $x$. $p(l_I(x)=l)=p(l|I,x)$ is the probability that $I$ is from class $l$ given the observed feature located at $x$. If $I$ is from class $l$, then $p(l|I,x)$ reveals the distinctiveness of local features for class $l$. For simplified notation, let $L_I$ and $L_I=l$ denote and $\{l_I(x)=l\}_x$, respectively.

2.2 Initial Distinctiveness Estimation

Anatomical features through local image patches are represented and have $p(l|I,x)=p(l|I(N(x)))$ and $p(L_I=l)=\Pi_x p(l_I(x)=l|I(N(x)))$, where $N$ is a neighborhood surrounding $x$.

Given a set of training images, multi-atlas label fusion is applied to estimate $p(l|I(N(x)))$ for each training image, with the remaining training images used as atlases. Let $\{A_F^1, \ldots, A_F^m\}$ be m atlases, warped to a target image $I$ by deformable registration. Image similarity-based locally weighted voting estimates $p(l|I(N(x)))$ as follows:

$$p(l|I(N(x))) = \sum_{i=1}^{m} w_x^i p(l|A_F^i, x) \quad (1)$$

$p(l|A_F^i,x)$ is the probability that atlas $A_F^i$ votes for class $l$ at $x$. If $A_F^i$ is from class $l$, $p(l|A_F^i,x)=1$, or is set to 0 otherwise. $\{w_x^i\}_i$ are spatially varying voting weights, which are computed by joint label fusion [see paper to Wang et al. entitled, "Multi-atlas segmentation with joint label fusion," IEEE Transactions on Pattern Analysis and Machine Intelligence, 2013] in the experiments.

If $I$ is from class $l$, $p(l|I,x)$ defines a voxel-wise distinctive map for $I$. If $p(l|I,x)$ is close to 1, then the anatomical feature $I(N(x))$ is a distinct signature for $l$ because the feature is only dominant in training images from class $l$. On the other hand, if $p(l|I,x)$ is small, then the feature is not distinctive for $l$ as it is also common in other classes.

2.3 Joint Refinement: Accommodating Inter-Image Correlations

The above voxel-wise distinctiveness estimation is produced for each training image independently. Hence, the estimation produced using different images may be inconsistent with each other due to noise effects. To address this problem, a joint estimation technique was adopted to reduce noise and ensure that the estimated distinctive regions obtained from different images for the same class are consistent with each other.

Let $\mathcal{L}_k$ and $\mathcal{L}_k=1$ denote $\{L_{I_k^1}, \ldots, L_{I_k^{n_k}}\}$ and $\{L_{I_k^1}=1, \ldots, L_{I_k^{n_k}}=1\}$, respectively. In order to take correlations between images from the same class into consideration, the estimation is made for all images jointly, i.e., estimating $P(\mathcal{L}_k=1)$. To this end, the pseudo-likelihood approximation technique is applied [see paper to Besag entitled, "Statistical analysis of non-lattice data," J. R. Statist. Soc. B, 1975] to estimate the joint probability for each class $l$ by:

$$p(\mathcal{L}_k = l) = \prod_{i=1}^{n_k} p(L_{I_k^i} = l | \{L_{I_k^j} = l\} j \neq i) \quad (2)$$

Pseudo-likelihood estimation is an iterative process. The initial probability maps for each image are produced using (1), by taking training images from all classes as atlases. In the following iterations, the probability maps produced for each image is updated one at a time, based on the probability maps produced for other training images from the same class at the current iteration, as follows:

$$p(L_{I_k^i} = l | \{L_{I_k^j} = l\} j \neq i) = \sum_{j=1, j \neq i}^{n_k} w_x^j p(l | I_k^{j \to i}, x) \quad (3)$$

$I_k^{j \to i}$ is the image warped from $I_k^j$ to $I_k^i$ through deformable registration. $p(l|I_k^{j \to i},x)$ is the probability that $I_k^j$ votes for $l$ at $x$. Unlike (1), where binary votes are employed from each atlas, $p(l|I_k^{j \to i},x)$ is derived from warping the probability maps produced for $I_k^j$ at the current iteration. Again, the voting weights are computed using joint label fusion. The iterative update process stops when the differences produced by consecutive iterations are smaller than a preselected threshold or the maximal iteration has been reached.

3 Application: ROI-Based Body Part Recognition

The method described above produces a distinctiveness map for each training image. In this section, how to use these results for image classification is shown.

To classify a testing image $I$, the voxel-wise distinctiveness scores are propagated to the testing image from each training image through deformable registration. Each warped distinctiveness map provides a spatial prior on the distinctive anatomical regions for the corresponding class. The consensus distinctiveness map for each class is derived by averaging all propagated maps from the respective class. Then a threshold is applied to produce a ROI segmentation from each consensus distinctiveness map. For simplicity, equal size ROI segmentations were produced for different classes in the experiments, but the voxel-wise distinctiveness maps allow one to efficiently derive varying size ROI segmentations for different classes. ROI segmentations in two image classification schemes are applied: registration-based multi-atlas classification and standard learning-based classification without using registration.

3.1 Registration-Based Classification

Following [see paper to Coupe et al. entitled, "Simultaneous segmentation and grading anatomical structures for patient's classification: application to Alzheimer's disease," NeuroImage, 2012], the voxel-wise label posterior $p(l|I,x)$ estimated by (1) using training images from all classes for image classification was applied. To reach an image level classification decision, these voxel-level label posteriors were aggregated into a single image-level score by averaging the voxel-wise class posteriors over the ROI segmentation produced for each class as follows:

$$p(l|I) \sim \frac{\sum_{ROI_l(x)=1} p(l|I,x)}{\sum_x ROI_l(x)} \quad (4)$$

is the binary ROI mask for $l$. With aggregated scores, classification is achieved by choosing the label with maximal scores, i.e. $\mathrm{argmax}_l p(l|I)$.

3.2 Classification without Using Registration

For faster classification, ROI detection is applied in a standard learning-based classification scheme that removes the requirement for pairwise registrations between each training image and a testing image. For fast ROI propagation, one class specific template for each class using all training images from the respective class was built. Each training image is only registered to its corresponding class template, from which the consensus class specific voxel-wise distinctiveness map and ROI segmentation are obtained within each template. Given a testing image, the ROI segmentations are propagated by only registering each of the class-specific templates to the testing image.

To apply learning-based classification, after propagating class-specific ROIs to an image, an image patch is extracted for each class from the image, where the patch is a minimal rectangle containing the respective ROI segmentation. Image features calculated from each of the extracted patches are concatenated into one feature vector, which is then fed into a support vector machine (SVM) classifier for classification.

For patch feature extraction, we tested four types of features: histogram of gradients (HoG) [see paper to Dalal entitled, "Histograms of oriented gradients for human detection," IEEE Computer Society Conference on Computer Vision and Pattern Recognition, 2005], Local binary patterns (LBP) [see paper to Ojala et al. entitled, "A comparative study of texture measures with classification based on featured distributions," Pattern Recognition, 1996], Haar features and features generated by the VGG-M convolutional neural network (CNN) [see paper to Chatfield et al. entitled, "Return of the devil in the details: Delving deep into convolutional nets," arXiv, 2014], and pre-trained on the ImageNet database were tested. For CNN features, the 4096D fully-connected layer feature vector were extracted from the network.

4 Experiments 4.1 Data Description 75 axially acquired cardiac CT scans were used in the study. Representative 2D axial slices are selected from the 3D CT dataset and are categorized into nine semantic classes to capture the most significant cardiac anatomy for disease detection (as shown in FIG. 1). Since the CT scans were acquired for characterizing different cardiac diseases, the body part regions covered by different scans may vary. Hence, not all nine body part classes are visible in all CT scans. When a body part class is visible in one CT scan, a representative slice is chosen by a clinician for that class to create the annotated images. A total of 519 labeled 2D images were generated. Histogram equalization was applied to improve intensity contrast between tissues and resampled the 2D images to have 5 mm$^2$ resolution.

4.2 Experiment Setup 5-fold cross-validation was conducted. Recall that the class specific ROI segmentation is produced by thresholding the consensus distinctiveness priors propagated from training images. The size of ROI segmentation is a free parameter in the experiment. To choose an optimal ROI segmentation size, a parameter search was applied using the training images in a leave-one-out test with multi-atlas classification. The parameter searching ranges from 1% of the image size to 5% of the image size, with a 1% of the image size step. The parameter producing the best classification performance on the training images is applied for generating ROI segmentation for testing images for both multi-atlas classification and learning-based classification.

4.3 Implementation Details

Image-based registration was computed using the Advanced Normalization Tools (ANTs)[see paper to Avants et al. entitled, "Symmetric diffeomorphic image registration with cross-correlation: evaluating automated labeling of elderly and neurodegenerative brain," Medical Image Analysis, 2008] with the Mattes mutual information metric. The joint label fusion software distributed from ANTs with the default parameters was applied, except that the patch searching radius is set to 0 for a faster label fusion speed. To improve the accuracy and speed of label fusion, atlas selection was applied based on global image similarity between each warped atlas image and the target image using normalized cross-correlation [see papers to Rohlfing et al. entitled, "Evaluation of atlas selection strategies for atlas-based image segmentation with application to confocal microscopy images of bee brain," NeuroImage, 2004; and to Aljabar et al. entitled, "Multi-atlas based segmentation of brain images: Atlas selection and its effect on accuracy," NeuroImage, 2009] to estimate (1). To avoid the bias caused by unbalanced class sizes, the top 10 most similar atlases from each class are selected for label fusion. For joint refinement, no atlas selection was applied. With the above setting, each registration task can be computed within a few seconds and each label fusion task can be computed within 30 seconds.

The iterative joint estimation process typically converges within a few iterations. In one non-limiting example, the maximal iteration was set to five.

Evaluation Criterion

As per the disclosure in the paper to Yan et al. entitled, "Bodypart recognition using multi-stage deep learning", margin 0 accuracy and margin 1 accuracy are defined. In margin 0 accuracy, a predicted label l' is considered to be correct if and only if it equals the ground truth label l. In margin 1 accuracy, a predicted label is considered to be correct if and only if the predicted label is located within one spatial neighbor of the ground truth.

4.4 Results

FIG. 1 illustrates semantic categories of example axial cardiac CT slices. In this example, 9 classes are defined. One example image is given for each class. The map next to each image is the output produced by the present invention, which indicates how useful each image sub-region is for classifying the image. As one moves in superior-inferior direction, these are (from upper left to lower right in the image): l=1: Thoracic inlet/supraclavicular region, l=2: Lung apex/sternum, l=3: Origin of great vessels/aortic arch, l=4: Aortic arch/pre-vascular space, l=5: Ascending aorta/descending aorta/Aortopulmonary window, l=6: Pulmonary trunk/origin of right left pulmonary arteries, l=7: Aortic valve/aortic root origin ascending aorta, l=8: axial four chamber view 1, l=9: axial two chamber view. Next to each image is the estimated distinctiveness map by the present method. The anatomical regions that are essential for defining each class are properly highlighted. ROI segmentations with size of 3% image size derived from the distinctive maps are shown in white contours on raw images. Turquoise rectangles show the corresponding ROI image patches.

Figure 2:
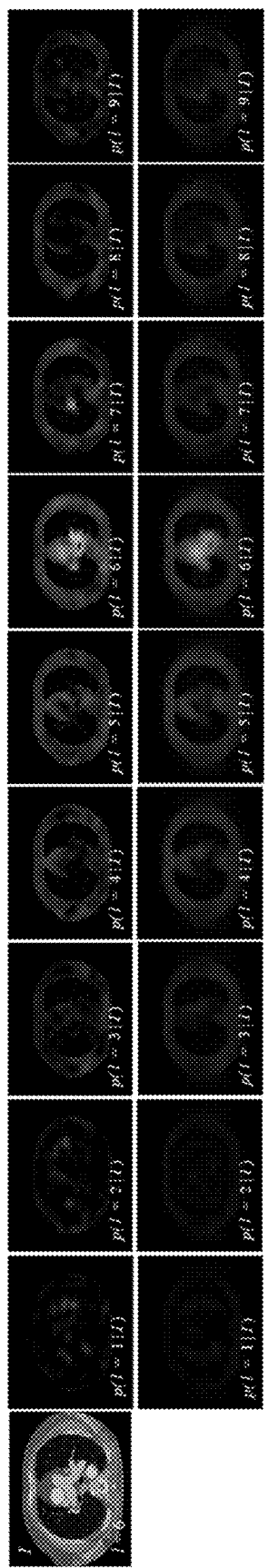
FIG. 2 shows estimated probability maps produced for one image (l=6) in FIG. 1.

FIG. 2 shows estimated probability maps produced for one image (l=6) in FIG. 1. First and second rows are initial and final estimations, respectively. The noise effect is clearly visible in the initial estimations and is greatly reduced after joint refinement. The semantic labels of this image are pulmonary trunk/origin of right and left pulmonary arteries. Probability map corresponding to l=6, i.e., the estimated distinctiveness map, shows the highest intensity. It is also noteworthy that the area of the anatomy corresponding to the semantic labels for this class have the highest values of probability within the l=6 map.

FIG. 1 also shows distinctiveness maps, ROI segmentations/patches produced for the example images. Overall, the produced distinctiveness maps accurately reflect the most distinctive anatomical regions for each class. For instance, the vessel region is highlighted for class 3, the origin of great vessels. The aortic and pulmonary vessels are highlighted for classes 4, 5, and 6. The brightest region produced for class 7 (aortic root) is around the aortic root region. The cardiac regions are highlighted in the two/four chamber view classes.

Classification Accuracy

Multi-atlas classification without using class specific ROI segmentation, i.e., scores are averaged over the entire image, produced 84.8% margin 0 accuracy and 97.2% margin 1 accuracy. Using class specific ROIs for score aggregation improved the accuracy to 92.1% and 99.2%, respectively.

Table 1 summarizes learning-based classification results. When image features are extracted from global images, the best margin 0 and margin 1 accuracy produced by using a single feature type are 64.7% and 90.8%, respectively. The results are improved to 81.9% and 96.3%, respectively, by using class-specific ROI patches. Note that since we applied a pre-trained CNN for feature extraction, the CNN features performed competitively but worse than HoG features. These results clearly demonstrate that class specific ROIs derived by the present method accurately located distinctive anatomical regions for the classification task. The results also demonstrate the power of registration-based classification for anatomy recognition, which produced substantially better classification accuracy than classification without using registration.

Overall, multi-atlas classification produced substantially better classification accuracy than learning-based multi-atlas classification for anatomy recognition.

TABLE 1

Margin 0/Margin 1 accuracy produced by learning-based classification with different features

| Feature Type | HoG | LBP | Haar | CNN |
| --- | --- | --- | --- | --- |
| Global | 64.7%/90.4% | 43.9%/77.1% | 61.3%/89.4% | 60.5%/90.8% |
| ROI patch | 81.9%/96.3% | 58.3%/86.2% | 74.8%/90.3% | 74.0%/94.4% |

The ROI-based multi-atlas classification results also compare favorably to the state-of-the-art. Yan et al. [in their paper entitled, "Bodypart recognition using multi-stage deep learning," Springer, 2015] developed a deep learning approach for body part recognition using body CT, where 11 categories were created to cover the whole body, including the head, trunk, and extremities. Using over 2000 training images, Yan et al. produced 89.8% margin 0 accuracy and 99.1% margin 1 accuracy. Note that direct comparisons of quantitative results across publications are not always fair due to the inconsistency in problem definition, the imaging protocol, and the patient population. However, the comparisons indicate the highly competitive performance produced by the ROI detection and multi-atlas classification.

A multi-atlas approach was proposed to generate distinctive ROI for anatomy classification. Given training images with image-level class labels, the present method produces voxel-wise estimations for each training image indicating spatial varying distinctiveness for categorizing the image. A fast approach was shown for deriving class-specific ROI patches for new testing images using the produced distinctiveness maps on training images. The derived class specific ROIs substantially improved classification accuracy in cardiac CT body part classification.

For simplicity, equal size ROI segmentations were applied for different classes in the experiments. However, it is reasonable to expect that optimal class-specific ROI segmentations may have varying sizes across classes. In addition, over the last few years convolution nets have produced state-of-the-art results in several applications of medical image analysis. Patch-based convolution net training is a common practice due to the limited number of medical images available for training compared to natural images. Therefore, wise distinctive patch selection is important and may help to improve the network training and prediction outcome.

In one embodiment, the present invention provides a method to detect anatomical region of interest (ROI) from training images having class labels to help image classification performance, the method comprising: (a) receiving, as input, a plurality of images, each image in the plurality of images having a class label $1 \leq l \leq L$ and a positive threshold th between 0 and 1; (b) computing a discriminative score map for each image in the plurality of images using all remaining images as training images, where the discriminative score map for a given image comprises a spatial varying discriminative score for each image location within the given image; (c) for each class label l, smoothing discriminative score maps produced for images with label l; and (d) producing a region of interest mask for each image in the plurality of images by thresholding its discriminative score map by th such that the produced mask has value 1 for pixels with discriminative scores greater than th and 0, otherwise.

In an extended embodiment, the step of computing a discriminative score map for one target image I with label l using a set of training images $I_1, \ldots, I_n$ comprises: (a) calculating deformable transformation between each training image $I_i$ in the set of training images $I_1, \ldots, I_n$ and the target image I based on an Advanced Normalization Tools (ANTs) registration algorithm; (b) warping each training image $I_i$ in the set of training images $I_1, \ldots, I_n$ to align with the target image I using the deformable transformation produced in (a), where resulting warped image for $I_i$ is $F_i$; (c) for each location x in the target image I, calculating a non-negative weight $w_i(x)$ for each warped training image $F_i$ at location x by a joint label fusion algorithm using image intensity information in a neighborhood of x; and (d) calculating the discriminative score map for the target image at location x by summing the weights calculated in (c) for training images with class label l divided by the summed weights for all training images.

In another extended embodiment, the step of smoothing discriminative score maps produced for images with label l comprises: (a) receiving, as input, images with class label l, $I_1, \ldots, I_{n_l}$, and their corresponding discriminative score maps, $S_1, \ldots, S_{n_l}$, and iteration number IT; (b) for each image $I_i$ ($1 \leq i \leq n_l$), calculating deformable transformation between each of remaining image $I_j$ ($j \neq i$) and $I_i$ using Advanced Normalization Tools (ANTs) registration algorithm; (c) for each image $I_i$ ($1 \leq i \leq n_l$), warping each of the remaining image to $I_i$ using the respective deformable transformation calculated in 3(b), with resulting warped image for $I_j$ ($j \neq i$) is $F_j$; (d) for each location x in $I_i$, calculating a non-negative weight $w_j(x)$ for each image $F_j$ ($j \neq i$) at location x by a joint label fusion algorithm using image intensity information in a neighborhood of x; (e) updating image $I_i$'s smoothed discriminative score at location x by $$S_i(x) = \frac{\sum_{j=1, j\neq i}^{n_l} w_j(x) S_j(x)}{\sum_{j=1, j\neq i}^{n_l} w_j(x)};$$

and (f) repeating 3(d) through 3(e) N times.

The present invention also discloses an article of manufacture having non-transitory computer readable storage medium comprising computer readable program code executable by a processor in a mobile device to implement the methods described above.

In another embodiment, the present invention also provides a method to detect anatomical region of interest (ROI) from training images having class labels to help image classification performance, the method comprising: (a) receiving, as input, a plurality of images, each image in the plurality of images having a class label 1≤l≤L and a positive threshold th between 0 and 1; (b) computing a discriminative score map for each image in the plurality of images using all remaining images as training images, where the discriminative score map for a given image comprises a spatial varying discriminative score for each image location within the given image, wherein the step of computing a discriminative score map for one target image I with label l using a set of training images $I_1, \ldots, I_n$ comprises: (i) calculating deformable transformation between each training image $I_i$ in the set of training images $I_1, \ldots, I_n$ and the target image I based on an Advanced Normalization Tools (ANTs) registration algorithm; (ii) warping each training image $I_i$ in the set of training images $I_1, \ldots, I_n$ to align with the target image I using the deformable transformation produced in step (b)(i), where resulting warped image for $I_i$ is $F_i$; (iii) for each location x in the target image I, calculating a non-negative weight $w_i(x)$ for each warped training image $F_i$ at location x by a joint label fusion algorithm using image intensity information in a neighborhood of x; and (iv) calculating the discriminative score map for the target image at location x by summing the weights calculated in (b)(iii) for training images with class label l divided by the summed weights for all training images; (c) for each class label l, smoothing discriminative score maps produced for images with label l, wherein the step of smoothing discriminative score maps produced for images with label l comprises: (i) receiving, as input, images with class label l, $I_1, \ldots, I_{n_l}$, and their corresponding discriminative score maps, $S_1, \ldots, S_{n_l}$, and iteration number IT; (ii) for each image $I_i$ (1≤i≤$n_l$), calculating deformable transformation between each of remaining image $I_j$ (j≠i) and $I_i$ using Advanced Normalization Tools (ANTs) registration algorithm; (iii) for each image $I_i$ (1≤i≤$n_l$), warping each of the remaining image to $I_i$ using the respective deformable transformation calculated in (c)(ii), with resulting warped image for $I_j$ (j≠i) is $F_j$; (iii) for each location x in $I_i$, calculating a non-negative weight $w_j(x)$ for each image $F_j$ (j≠i) at location x by a joint label fusion algorithm using image intensity information in a neighborhood of x; (iv) updating image $I_i$'s smoothed discriminative score at location x by $$S_i(x) = \frac{\sum_{j=1, j\neq i}^{n_l} w_j(x) S_j(x)}{\sum_{j=1, j\neq i}^{n_l} w_j(x)};$$

and (v) repeating (c)(iv) through (c)(v) N times; and (d) producing a region of interest mask for each image in the plurality of images by thresholding its discriminative score map by th such that the produced mask has value 1 for pixels with discriminative scores greater than th and 0, otherwise.

Figure 3:
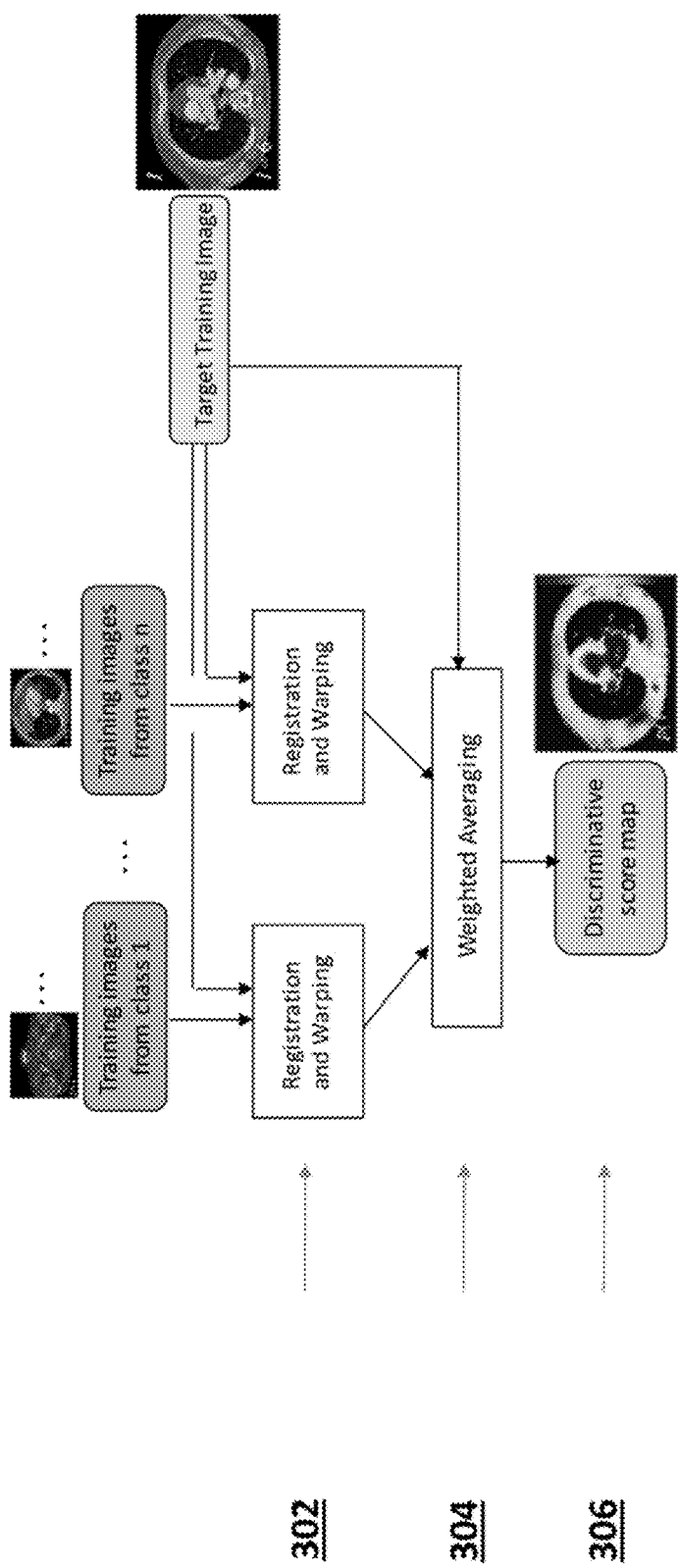
FIG. 3 further illustrates the steps involved in generating an initial estimate for each training image.

FIG. 3 further illustrates the steps involved in generating an initial estimate for each training image. The step of computing a discriminative score map for one target image I with label l using a set of training images $I_1, \ldots, I_n$ comprises: (a) calculating deformable transformation between each training image $I_i$ in the set of training images $I_1, \ldots, I_n$ and the target image I based on an Advanced Normalization Tools (ANTs) registration algorithm; (b) warping each training image $I_i$ in the set of training images $I_1, \ldots, I_n$ to align with the target image I using the deformable transformation produced in step (a), where resulting warped image for $I_i$ is $F_i$ (Note: steps (a) through (b) described herein are collectively depicted as step 302); (c) for each location x in the target image I, calculating a non-negative weight $w_i(x)$ for each warped training image $F_i$ at location x by a joint label fusion algorithm using image intensity information in a neighborhood of x (step 304); and (d) calculating the discriminative score map for the target image at location x by summing the weights calculated in (c) for training images with class label l divided by the summed weights for all training images (step 306).

Figure 4:
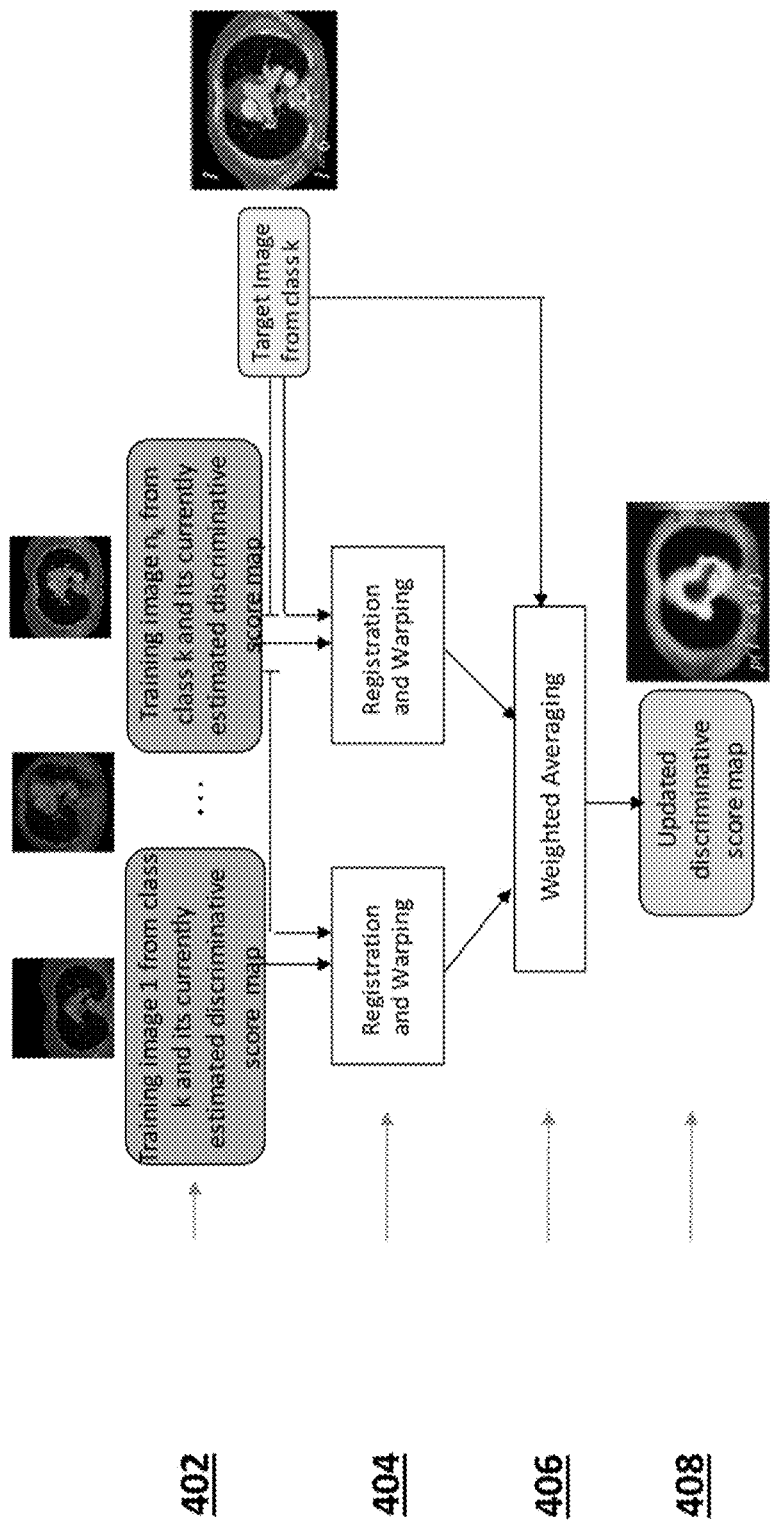
FIG. 4 further illustrates the method for iteratively refining probability maps for each class.

FIG. 4 further illustrates the method for iteratively refining probability maps for each class. The step of smoothing discriminative score maps produced for images with label l comprises: (a) receiving, as input, images with class label l, $I_1, \ldots, I_{n_l}$, and their corresponding discriminative score maps, $S_1, \ldots, S_{n_l}$, and iteration number IT (step 402); (b) for each image $I_i$ (1≤i≤$n_l$), calculating deformable transformation between each of remaining image $I_j$ (j≠i) and $I_i$ using Advanced Normalization Tools (ANTs) registration algorithm; (c) for each image $I_i$ (1≤i≤$n_l$), warping each of the remaining images to $I_i$ using the respective deformable transformation calculated in (b), with resulting warped image for $I_j$ (j≠i) is $F_j$ (Note: steps (b) through (c) described herein are collectively depicted as step 404); (d) for each location x in $I_i$, calculating a non-negative weight $w_j(x)$ for each image $F_j$ (j≠i) at location x by a joint label fusion algorithm using image intensity information in a neighborhood of x (step 406); (e) updating image $I_i$'s smoothed discriminative score at location x by $$S_i(x) = \frac{\sum_{j=1, j\neq i}^{n_l} w_j(x) S_j(x)}{\sum_{j=1, j\neq i}^{n_l} w_j(x)}$$

(step 408); (f) repeating step (d) through step (e) N times.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method has been shown in the above embodiments for the effective implementation of a weakly supervised probabilistic atlas generation through multi-atlas label fusion. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method to detect anatomical region of interest (ROI) from training images having class labels to help image classification performance, the method comprising:
    (a) receiving, as input, a plurality of images, each image in the plurality of images having a class label $1 \le l \le L$ and a positive threshold th between 0 and 1 for use with discriminative score maps;
    (b) computing a discriminative score map for each image in the plurality of images using all remaining images as training images, where the discriminative score map for a given image comprises a spatial varying discriminative score for each image location within the given image;
    (c) for each class label l, smoothing any of the discriminative score maps produced for images with the label l;
    (d) producing a region of interest mask for each image in the plurality of images by thresholding its discriminative score map by th such that the produced mask has value 1 for pixels with discriminative scores greater than th and 0, otherwise; and
    (e) performing image classification based on region of interest masks identified in (d).

2. The method of claim 1, wherein the step of computing a discriminative score map for one target image I with label l using a set of training images $I_1, \ldots, I_n$ comprises:
    (a) calculating a deformable transformation between each training image $I_i$ in the set of training images $I_1, \ldots, I_n$ and the target image I based on an Advanced Normalization Tools (ANTs) registration algorithm;
    (b) warping each training image $I_i$ in the set of training images $I_1, \ldots, I_n$ to align with the target image I using the deformable transformation produced in step 2(a), where resulting warped image for $I_i$ is $F_i$;
    (c) for each location x in the target image I, calculating a non-negative weight $w_i(x)$ for each warped training image $F_i$ at location x by a joint label fusion algorithm using image intensity information in a neighborhood of x; and
    (d) calculating the discriminative score map for the target image at location x by summing the weights calculated in 2(c) for training images with class label l divided by the summed weights for all training images.

3. The method of claim 1, wherein the step of smoothing discriminative score maps produced for images with label l comprises:
    (a) receiving, as input, images with class label l, $I_i$, K, $I_{n_l}$, and their corresponding discriminative score maps, $S_1$, K, $S_{n_l}$, and iteration number IT;
    (b) for each image $I_i$ ($1 \le i \le n_l$) in 3(a), calculating deformable transformation between each remaining image $I_j$ ($j \ne i$) and $I_i$ using Advanced Normalization Tools (ANTs) registration algorithm;
    (c) for each image $I_i$ ($1 \le i \le n_l$) in 3(a), warping each of the remaining images to $I_i$ using the respective deformable transformation calculated in 3(b), resulting in warped image for $I_j$ ($j \ne i$) is $F_j$;
    (d) for each location x in $I_i$, calculating a non-negative weight $w_j(x)$ for each image $F_j$ ($j \ne i$) at location x by a joint label fusion algorithm using image intensity information in a neighborhood of x;
    (e) updating image $I_i$'s smoothed discriminative score at location x by $$S_i(x) = \frac{\sum_{j=1, j \ne i}^{n_l} w_j(x) S_j(x)}{\sum_{j=1, j \ne i}^{n_l} w_j(x)};$$

(f) repeating 3(d) through 3(e) N times.

4. The method of claim 1, wherein the input plurality of images comprises a plurality of cardiac CT images.

5. The method of claim 1, wherein the method is used in body part recognition.

6. The method of claim 1, wherein the method is used in disease classification.

7. An article of manufacture having non-transitory computer readable storage medium comprising computer readable program code executable by a processor in a mobile device to implement a method to detect anatomical region of interest (ROI) from training images having class labels to help image classification performance, the non-transitory computer readable storage medium comprising:
    (a) computer readable program code receiving, as input, a plurality of images, each image in the plurality of images having a class label $1 \le l \le L$ and a positive threshold th between 0 and 1 for use with discriminative score maps;
    (b) computer readable program code computing a discriminative score map for each image in the plurality of images using all remaining images as training images, where the discriminative score map for a given image comprises a spatial varying discriminative score for each image location within the given image;
    (c) computer readable program code, for each class label l, smoothing discriminative score maps produced for images with label l;
    (d) computer readable program code producing a region of interest mask for each image in the plurality of images by thresholding its discriminative score map by th such that the produced mask has value 1 for pixels with discriminative scores greater than th and 0, otherwise; and
    (e) computer readable program code performing image classification based on region of interest masks identified in (d).

8. The article of manufacture of claim 7, wherein computer readable program code computing a discriminative score map for one target image I with label l using a set of training images $I_1, \ldots, I_n$ further comprises:
    (a) computer readable program code calculating deformable transformation between each training image $I_i$ in the set of training images $I_1, \ldots, I_n$ and the target image I based on an Advanced Normalization Tools (ANTs) registration algorithm;
    (b) computer readable program code warping each training image $I_i$ in the set of training images $I_i, \ldots, I_n$ to align with the target image I using the deformable transformation produced in step 8(a), where resulting warped image for $I_i$ is $F_i$;
    (c) computer readable program code, for each location x in the target image I, calculating a non-negative weight $w_i(x)$ for each warped training image $F_i$ at location x by a joint label fusion algorithm using image intensity information in a neighborhood of x; and
    (d) computer readable program code calculating the discriminative score map for the target image at location x by summing the weights calculated n 8(c) for training images with class label l divided by the summed weights for all training images.

9. The article of manufacture of claim 7, wherein the step of smoothing discriminative score maps produced for images with label l comprises:
   (a) computer readable program code receiving, as input, images with class label l, $I_1$, K, $I_{n_l}$, and their corresponding discriminative score maps, $S_1$, K, $S_{n_l}$, and iteration number IT;
   (b) computer readable program code, for each image $I_i$ ($1 \leq i \leq n_l$), calculating deformable transformation between each of remaining image $I_j$ ($j \neq i$) and $I_i$ using Advanced Normalization Tools (ANTs) registration algorithm;
   (c) computer readable program code, for each image $I_i$ ($1 \leq i \leq n_l$), warping each of the remaining image to $I_i$ using the respective deformable transformation calculated in 9(b), with resulting warped image for $I_j$ ($j \neq i$) is $F_j$;
   (d) computer readable program code, for each location x in $I_i$, calculating a non-negative weight $w_j(x)$ for each image $F_j$ ($j \neq i$) at location x by a joint label fusion algorithm using image intensity information in a neighborhood of x;
   (e) computer readable program code updating image $I_i$'s smoothed discriminative score at location x by $$S_i(x) = \frac{\sum_{j=1, j \neq i}^{n_l} w_j(x) S_j(x)}{\sum_{j=1, j \neq i}^{n_l} w_j(x)};$$

(f) computer readable program code repeating 9(d) through 9(e) N times.

10. The article of manufacture of claim 7, wherein the input plurality of images comprises a plurality of cardiac CT images.

11. The article of manufacture of claim 7, wherein the method is used in body part recognition.

12. The article of manufacture of claim 7, wherein the method is used in disease classification.

13. A method to detect anatomical region of interest (ROI) from training images having class labels to help image classification performance, the method comprising:
   (a) receiving, as input, a plurality of images, each image in the plurality of images having a class label $1 \leq l \leq L$ and a positive threshold th between 0 and 1 for use with discriminative score maps;
   (b) computing a discriminative score map for each image in the plurality of images using all remaining images as training images, where the discriminative score map for a given image comprises a spatial varying discriminative score for each image location within the given image, wherein the step of computing a discriminative score map for one target image I with label l using a set of training images $I_1, \ldots, I_n$ comprises:
      i. calculating a deformable transformation between each training image $I_i$ in the set of training images $I_1, \ldots, I_n$ and the target image I based on an Advanced Normalization Tools (ANTs) registration algorithm;
      ii. warping each training image $I_i$ in the set of training images $I_1, \ldots, I_n$ to align with the target image I using the deformable transformation produced in step 13(b)(i), where the resulting warped image for $I_i$ is $F_i$;
      iii. for each location x in the target image I, calculating a non-negative weight $w_i(x)$ for each warped training image $F_i$ at location x by a joint label fusion algorithm using image intensity information in a neighborhood of x; and
      iv. calculating the discriminative score map for the target image at location x by summing the weights calculated in 13(b)(iii) for training images with class label l divided by the summed weights for all training images;
   (c) for each class label l, smoothing discriminative score maps produced for images with label l, wherein the step of smoothing discriminative score maps produced for images with label l comprises:
      i. receiving, as input, images with class label l, $I_1$, K, $I_{n_l}$, and their corresponding discriminative score maps, $S_1$, K, $S_{n_l}$, and iteration number IT;
      ii. for each image $I_i$ ($1 \leq i \leq n_l$), calculating deformable transformation between each of the remaining images $I_j$ ($j \neq i$) and $I_i$ using Advanced Normalization Tools (ANTs) registration algorithm;
      iii. for each image $I_i$ ($1 \leq i \leq n_l$), warping each of the remaining images to $I_i$ using the respective deformable transformation calculated in 13(c)(ii), with the resulting warped image for $I_j$ ($j \neq i$) is $F_j$;
      iv. for each location x in $I_i$, calculating a non-negative weight $w_j(x)$ for each image $F_j$ ($j \neq i$) at location x by a joint label fusion algorithm using image intensity information in a neighborhood of x;
      v. updating image $I_i$'s smoothed discriminative score at location x by $$S_i(x) = \frac{\sum_{j=1, j \neq i}^{n_l} w_j(x) S_j(x)}{\sum_{j=1, j \neq i}^{n_l} w_j(x)};$$

vi. repeating 13(c)(iv) through 13(c)(v) N times;
   (d) producing a region of interest mask for each image in the plurality of images by thresholding its discriminative score map by th such that the produced mask has value 1 for pixels with discriminative scores greater than th and 0, otherwise; and
   (e) performing image classification based on region of interest masks identified in (d).

14. The method of claim 13, wherein the input plurality of images comprises a plurality of cardiac CT images.

15. The method of claim 13, wherein the method is used in body part recognition.

16. The method of claim 13, wherein the method is used in disease classification.

* * * * *